(12) United States Patent
Fusco

(10) Patent No.: US 10,861,312 B2
(45) Date of Patent: Dec. 8, 2020

(54) BABY MONITOR

(71) Applicant: SUMMER INFANT (USA), INC., Woonsocket, RI (US)

(72) Inventor: Michael Thomas Fusco, Greenville, RI (US)

(73) Assignee: SUMMER INFANT (USA), INC., Woonsocket, RI (US)

( * ) Notice: Subject to any disclaimer, the term of this patent is extended or adjusted under 35 U.S.C. 154(b) by 0 days.

(21) Appl. No.: 16/123,485

(22) Filed: Sep. 6, 2018

(65) Prior Publication Data

US 2019/0073888 A1 Mar. 7, 2019

Related U.S. Application Data

(60) Provisional application No. 62/554,606, filed on Sep. 6, 2017.

(51) Int. Cl.
| | |
|---|---|
| *G06K 9/62* | (2006.01) |
| *G08B 21/02* | (2006.01) |
| *H04N 21/41* | (2011.01) |
| *H04N 5/225* | (2006.01) |
| *H04N 7/18* | (2006.01) |
| *G08B 21/04* | (2006.01) |

(52) U.S. Cl.
CPC ....... *G08B 21/0208* (2013.01); *G08B 21/023* (2013.01); *G08B 21/0294* (2013.01); *H04N 5/2256* (2013.01); *H04N 21/4131* (2013.01); *G08B 21/0476* (2013.01); *H04N 7/185* (2013.01)

(58) Field of Classification Search
CPC .............. G08B 21/0208; G08B 21/023; G08B 21/0294; G08B 21/0476; H04N 7/185; H04N 5/2256; H04N 21/4131
See application file for complete search history.

(56) References Cited

U.S. PATENT DOCUMENTS

| | | | |
|---|---|---|---|
| 7,697,891 B2 | 4/2010 | Desrosiers et al. | |
| 7,972,022 B2 | 7/2011 | Pohlert et al. | |
| 8,044,776 B2 | 10/2011 | Schofield et al. | |
| 8,120,716 B2 | 2/2012 | Vitito | |
| 9,618,827 B2 | 4/2017 | Shatz et al. | |
| 10,571,284 B2* | 2/2020 | Joao | H04W 4/027 |
| 2007/0156060 A1* | 7/2007 | Cervantes | A61B 5/0013 |
| | | | 600/534 |
| 2007/0241911 A1* | 10/2007 | Swan | G08B 21/0208 |
| | | | 340/573.1 |
| 2008/0224637 A1* | 9/2008 | Parker | H06B 47/10 |
| | | | 315/309 |
| 2009/0091617 A1* | 4/2009 | Anderson | H04N 5/2628 |
| | | | 348/143 |
| 2009/0095906 A1 | 4/2009 | Gavner et al. | |

(Continued)

*Primary Examiner* — Howard D Brown, Jr.
(74) *Attorney, Agent, or Firm* — Adler Pollock & Sheehan P.C.

(57) ABSTRACT

A baby monitor system includes a baby monitor unit, the baby monitor unit including at least a camera, a low-lighting feature and an illumination feature, and a remote control unit, the remote control unit including at least a display area, the display area including at least a video area and an illumination button, the video area configured to display video that is streamed from the baby monitor unit over a communications link between the baby monitor unit and the remote control unit.

32 Claims, 5 Drawing Sheets

(56) References Cited

U.S. PATENT DOCUMENTS

| | | | |
|---|---|---|---|
| 2010/0182518 A1* | 7/2010 | Kirmse | A47G 19/2227 348/836 |
| 2012/0169502 A1* | 7/2012 | Huang | G06F 19/3418 340/573.1 |
| 2013/0169735 A1* | 7/2013 | Barker | G08B 21/22 348/14.02 |
| 2015/0271375 A1* | 9/2015 | Chien | H04N 7/183 348/159 |
| 2015/0288877 A1* | 10/2015 | Glazer | G06K 9/00335 348/77 |
| 2016/0155310 A1* | 6/2016 | Joao | H04W 4/90 340/573.1 |
| 2016/0249096 A1* | 8/2016 | Ortiz | H04N 21/4367 |
| 2017/0000425 A1* | 1/2017 | Shtalryd | A61B 5/6804 |
| 2017/0108235 A1 | 4/2017 | Guan et al. | |
| 2019/0130720 A1* | 5/2019 | Lui | G06K 9/66 |

\* cited by examiner

BABY MONITOR

CROSS REFERENCE TO RELATED APPLICATIONS

This application claims benefit from U.S. Provisional Patent Application Ser. No. 62/554,606 filed Sep. 6, 2017, which is incorporated by reference in its entirety.

BACKGROUND OF THE INVENTION

The present invention relates generally to video monitors, and more particularly to a baby monitor.

In general, a baby monitor system may be may be used to remotely monitor activities of a baby. The baby monitor system may employ radio techniques to monitor the activities. For example, a baby monitor may include a transmitter unit and a receive unit. The transmitter unit may include a camera that produces video of the baby. The video may be processed by the transmitting unit. Processing may include transmitting the video to the receiver unit via radio waves. The receiver unit may receive the radio waves and process them into video that may be displayed at the receiving unit. The video may be seen by a person at or near the receiving unit. The person viewing the video may be able to discern from the video activities of the baby (e.g., whether the baby is awake or asleep).

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a baby monitor system including a baby monitor unit, the baby monitor unit including at least a camera, a low-lighting feature and an illumination feature, and a remote control unit, the remote control unit including at least a display area, the display area including at least a video area and an illumination button, the video area configured to display video that is streamed from the baby monitor unit over a communications link between the baby monitor unit and the remote control unit.

In another aspect, the invention features a baby monitor unit including a camera, a low-lighting feature, and an illumination feature.

In still another aspect, the invention features an apparatus including a camera for generating a video stream of a viewing area, a low-lighting feature for illuminating the viewing area for the camera under low-lighting conditions, and an illumination feature having an illumination device for illuminating the viewing area to enable the camera to provide full-color video in the video stream, the illumination feature increasing an intensity of the illumination device at a predetermined rate over a predetermined period of time until a predetermined maximum intensity of the illumination device is reached.

In yet another aspect, the invention features a method including providing a baby monitor system, the baby monitor system including a baby monitor unit, the baby monitor unit comprising at least a camera, a low-lighting feature and an illumination feature, a remote control unit, the remote control unit including at least a display area, the display area comprising at least a video area and an illumination button, the video area configured to display video that is streamed from the baby monitor unit over a communications link between the baby monitor unit and the remote control unit, and in response to an input from the illumination button, deactivating the low-lighting feature and activating the illumination feature.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
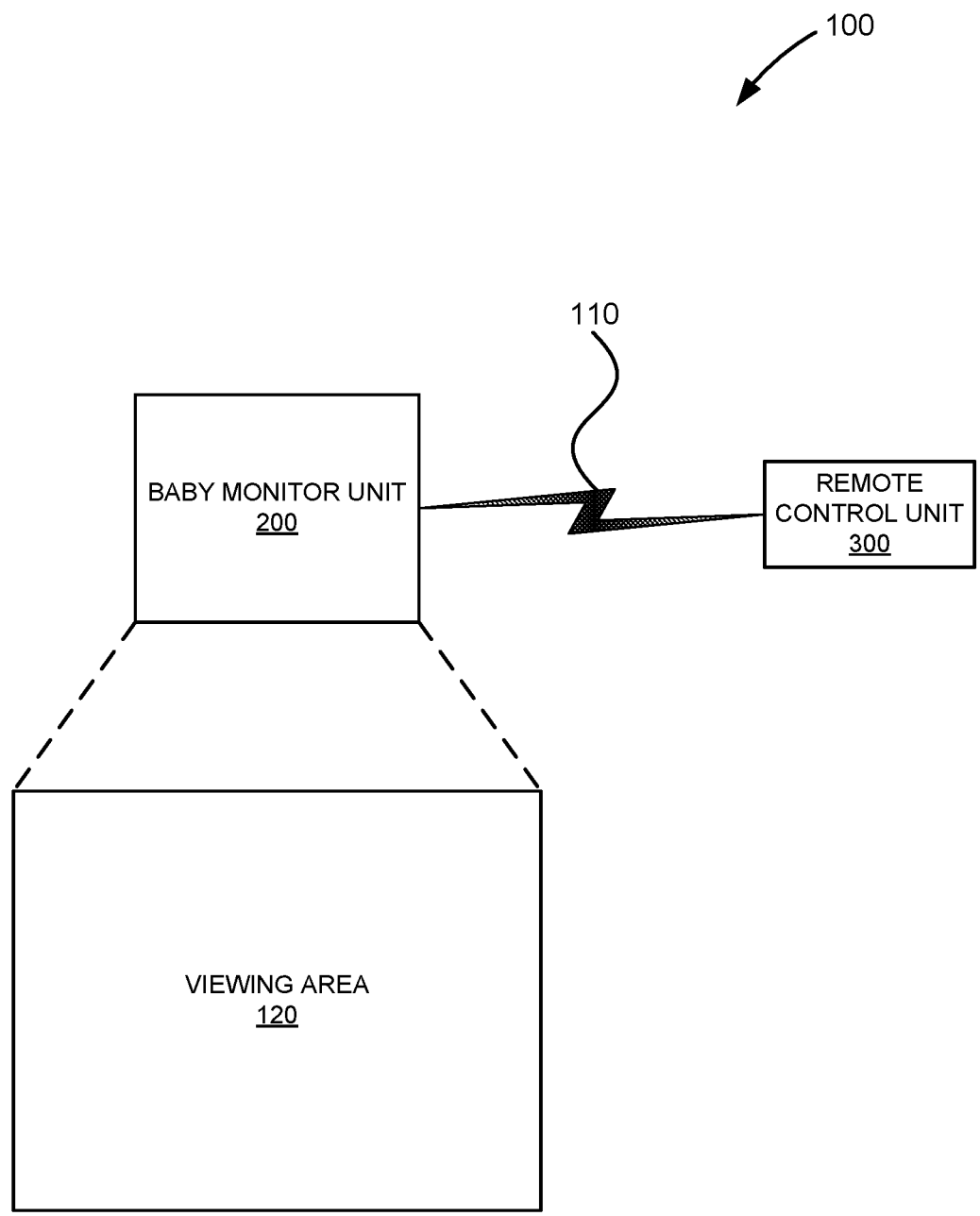
FIG. 1 illustrates an example embodiment of a baby monitor system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Embodiments described herein may include a baby monitor system for remotely monitoring activities of a baby. The baby monitor system may include a camera that may produce video of the baby's activities in real time when the baby is present in a viewing area of the camera. The baby monitor system may include a low-lighting feature that may illuminate the viewing area for the camera when the camera is operating in a low-lighting environment (e.g., a dark room). Moreover, the baby monitor system may include an illumination feature that may illuminate the viewing area to enable the camera to provide full color video of the viewing area.

The illumination feature may provide a soft glow light source mounted in, on, or remote from the baby monitor. The illumination feature may contain an illumination device which may increase in intensity at a predetermined rate over a predetermined period of time until a predetermined intensity is reached. The predetermined intensity may provide sufficient illumination of the viewing area to enable the camera to provide full-color video of the viewing area. In an embodiment, the predetermined rate and predetermined period of time may be factory set and not configurable by a user of the baby monitor system. Moreover, in this embodiment, the predetermined intensity may be configurable by the user. It should be noted, however, that in other embodiments other combinations of configurability of the predetermined rate, predetermined period of time, and/or predetermined intensity may be used.

FIG. 1 illustrates an example embodiment of a baby monitor system 100 that may incorporate techniques described herein. Referring to FIG. 1, system 100 may include a baby monitor unit 200 and a remote control unit 300. The baby monitor unit 200 may include provisions for viewing a viewing area 120. The remote control unit 300 may include provisions for controlling various features that may be provided by the baby monitor unit 200.

The baby monitor unit 200 and the remote control unit 300 may communicate via a communications link 110. The communications link 110 may be, for example, a wireless link.

Baby monitor unit 200 and remote control unit 300 may employ various protocols that may be used to exchange information (e.g., data) via the communications link 110. These protocols may include, for example, the Institute of Electrical and Electronics Engineers (IEEE) 802.11 protocol, Personal Communications Service (PCS) protocol, time division multiple access (TDMA) protocol, code division multiple access (CDMA) protocol, Bluetooth protocol, and/or Global System for Mobile Communications (GSM) protocol. It should be noted that other protocols may be used to exchange information between baby monitor unit 200 and remote control unit 300 via communications link 110.

Figure 2:
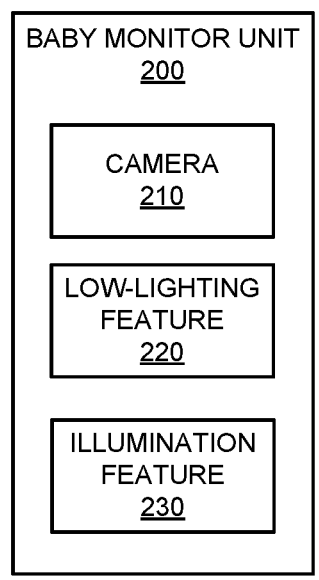
FIG. 2 illustrates an example embodiment of a baby monitor.

FIG. 2 illustrates an example embodiment of baby monitor unit 200. Referring now to FIG. 2, baby monitor unit 200 may include a camera 210, a low-lighting feature 220, and an illumination feature 230.

The camera 210 may provide video of a viewing area such as, for example, viewing area 120. The video may include, for example, full-motion video of the viewing area. The video may be streamed to the remote control unit 300 as, for example, a video stream.

The low-lighting feature 220 may include provisions for providing illumination of the viewing area 120 for the camera 210 when the camera 210 is operating in a low-lighting environment. The low-lighting feature 220 may contain an illumination device which may provide the illumination. In an embodiment, the illumination device includes one or more near infra-red (NIR) light-emitting diodes (LEDs) which provide illumination for the camera 210 in the low-lighting environment. It should be noted that when the low-lighting feature 220 is used to illuminate the viewing area 120, the camera 210 may only be capable of providing, for example, black and white video of the viewing area 120.

The illumination feature 230 may include provisions for providing sufficient illumination of the viewing area 120 to enable the camera 210 to stream full color video. These provisions may include an illumination device (e.g., LED, incandescent lamp). As will be described further below, activation and/or deactivation of the illumination feature 230 may be controlled by the remote control unit 300.

Figure 3:
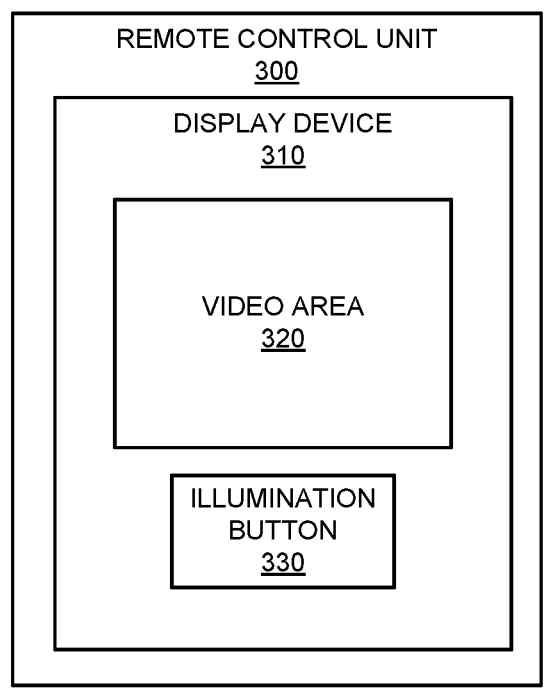
FIG. 3 illustrates an example embodiment of a remote control unit.

FIG. 3 illustrates an example embodiment of remote control unit 300. Referring to FIG. 3, remote control unit 300 may include a display device 310. The display device 310 may provide a display screen for displaying information. Examples of display devices that may be used include, but are not limited to, LED displays, organic LED (OLED) displays, thin film transistor (TFT) displays, in-plane switching (IPS) panels, and electroluminescence displays. The display screen may include a video area 320 and an illumination button 330.

The video area 320 may display video that may be streamed to the remote control unit 300 by, for example, the baby monitor unit 200. The video may include live video of the viewing area 120. The video may include black and white video and/or color video. The type of video (e.g., black and white, color) may depend, in part, on the capabilities of the camera 210 and/or the degree of illumination of the viewing area 120.

The illumination button 330 may enable a user to specify that the illumination feature 230 is to be activated and/or deactivated. These illumination button 330 may be implemented as a virtual button that is displayed on the display device 310.

For example, the display device 310 may include touchscreen capabilities that can sense when an area of the display device 310 is touched. A user may touch an area of the display device 310 where the illumination button 330 is displayed. In response, the display device 310 may sense the touch and provide an indication to, for example, a processor that may be contained in the remote control unit 300 that the area where the illumination button 330 is displayed has been touched. In response to this indication, the remote control unit 300 may provide an indication to the baby monitor unit 200 that the illumination button 330 has been pressed.

Referring now to FIGS. 1-3, suppose a user presses illumination button 330. Remote control unit 300 may send information via communications link 110 to baby monitor unit 200 that indicates that the illumination button 330 has been pressed.

The baby monitor unit 200 may receive the information and, in response, (1) deactivate (e.g., turn off) the low-lighting feature 220 and (2) activate (e.g., turn on) the illumination feature 230. After activation, the illumination feature 230 may provide a soft glow light source that increases in intensity over at a predetermined rate over a predetermined period of time to a predetermined intensity. The predetermined intensity may be set, for example, by the user. Note that the predetermined intensity may provide sufficient illumination to enable a full color viewing of the viewing area 120 using camera 210.

After the illumination button 330 is released, the baby monitor may deactivate the illumination feature 230. Deactivation of the illumination feature 230 may include, for example, slowly turning off the soft glow light source. After the soft glow light source is turned off, the baby monitor may activate the low-lighting feature 220. Activating the feature may include, for example, turning on NIR LEDs that may be contained in the low-lighting feature 220. Note that activating the illumination feature 230 after the illumination button 330 is pressed and deactivating the illumination feature 230 after the illumination button 330 is released may provide for a no-fail technique of turning the illumination feature 230 off.

It should be noted that in other embodiments, the illumination feature 230 may be activated and/or deactivated in other ways. For example, in an embodiment, the illumination feature 230 may be activated and/or deactivated by pressing the illumination button 330 multiple times. In still other embodiments, activation of the illumination feature 230 may be performed by pressing a first button and deactivation of the illumination feature 230 may be performed by pressing a second button. In still other embodiments, activation and/or deactivation of the illumination feature 230 may be performed by commands spoken into, for example, a microphone that may be contained in the remote control unit 300.

Moreover, it should be noted that in other embodiments, the order and/or timing of activating and deactivating the low-lighting feature 220 and the illumination feature 230 may be different. For example, in an embodiment, the low light feature 220 is deactivated after the illumination feature 230 reaches a certain intensity such as the predetermined intensity.

Figure 4:
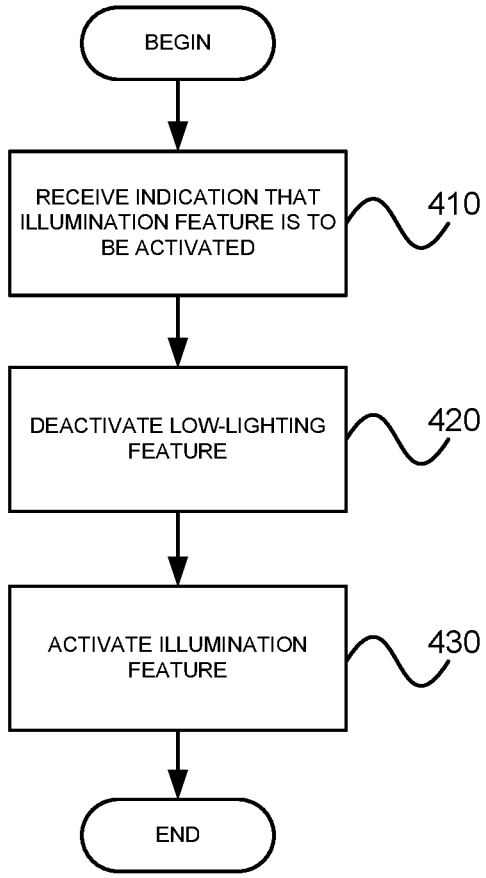
FIG. 4 illustrates a flow chart of an example sequence of acts that may be performed to activate an illumination feature that may be included in the baby monitor system illustrated in FIG. 1.

FIG. 4 is a flow chart of an example sequence of acts that may be performed to activate illumination feature 230. Referring now to FIGS. 1-4, at block 410 an indication to activate the illumination feature 230 is received.

For example, as noted above, a user may provide an indication to activate the illumination feature 230 by pressing illumination button 330. This indication may be received by baby monitor unit 200 in the form of information that is generated by remote control unit 300 and sent from the remote control unit 300 to the baby monitor unit 200 via communications link 110. After receiving the information, the baby monitor unit 200 may determine that an indication to activate the illumination feature 230 has been received.

At block 420, in response to the received indication, the low-lighting feature 220 is deactivated. For example, after receiving the indication, the baby monitor unit 200 may deactivate the low-lighting feature 220. As noted above, deactivating the low-lighting feature 220 may include turning off NIR LEDs that may be included in the low-lighting feature 220.

Also in response to the received indication, at block 430, the illumination feature 230 may be activated. As noted above, the baby monitor unit 200 may activate the illumination feature 230 by causing the illumination feature 230 to slowly illuminate viewing area 120 to a predetermined intensity. For example, the baby monitor unit 200 may include a parameter setting that reflects a maximum intensity level. The baby monitor unit 200 may slowly illuminate the viewing area 120 using one or more illumination devices (e.g., LEDs) that may be contained in the illumination feature 230.

Here, for example, the illumination devices may be configured by the baby monitor unit 200 to increase in intensity over time until the intensity of the illumination devices reaches the predetermined intensity. The increase may be performed, for example, gradually in accordance with a continuous or discrete function.

Figure 5:
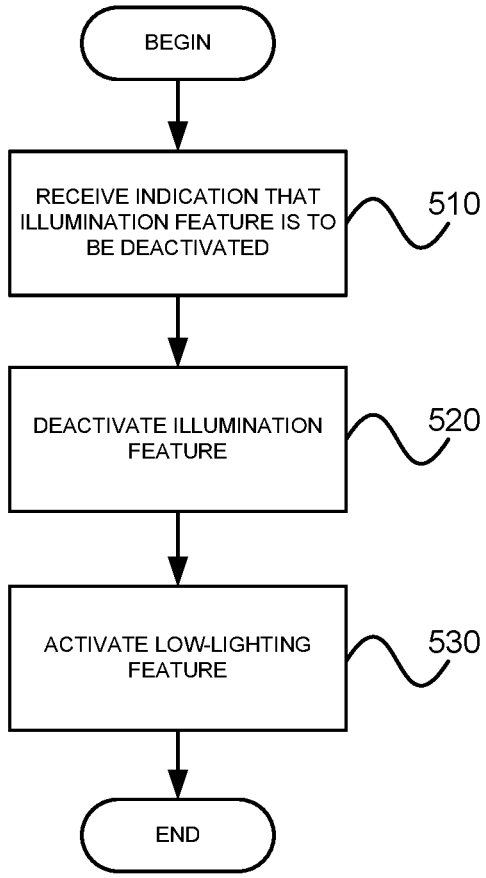
FIG. 5 illustrates a flow chart of an example sequence of acts that may be performed to deactivate an illumination feature that may be included in the baby monitor system illustrated in FIG. 1.

FIG. 5 is a flow chart of an example sequence of acts that may be performed to deactivate illumination feature 230. Referring now to FIGS. 1-3 and 5, at block 510 an indication to deactivate the illumination feature 230 is received.

For example, as noted above, a user may provide an indication to deactivate the illumination feature 230 by releasing illumination button 330. In response to sensing that the illumination button 330 has been released, the remote control unit 300 may generate information that provides an indication that the illumination feature 230 is to be deactivated. The remote control unit 300 may forward this information to the baby monitor unit 200 via communications link 110. The baby monitor unit 200 may receive the information and determine from the information that an indication to deactivate the illumination feature 230 has been received.

At block 520, in response to the received indication, the illumination feature 230 is deactivated. For example, after receiving the indication, the baby monitor unit 200 may deactivate the illumination feature 230 by slowly reducing its intensity. Reducing its intensity may reduce the illumination of the viewing area 120.

Also, in response to the received indication, at block 530, the low-lighting feature 220 may be activated. For example, as noted above, the low-lighting feature 220 may include NIR LEDs. The baby monitor unit 200 may activate the low-lighting feature 220 by turning on the NIR LEDs.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 4 and 5, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A baby monitor system comprising:
   a baby monitor unit, the baby monitor unit comprising at least a camera with a viewing area, a low-lighting feature that is configured to provide low illumination to the camera viewing area, and a separate illumination feature that is configured to provide greater illumination to the camera viewing area than the low-lighting feature; and
   a separate remote control unit that is configured to wirelessly communicate with the baby monitor unit, the remote control unit comprising at least a display area, the display area comprising at least a video area and an illumination button, the video area configured to display video that is streamed from the baby monitor unit over a communications link between the baby monitor unit and the remote control unit, wherein the illumination button is configured to enable a user to control whether the illumination feature of the baby monitor unit is to be activated and/or deactivated.

2. The baby monitor system of claim 1 wherein the illumination button is a virtual button that is displayed on the display device.

3. The baby monitor system of claim 1 wherein the illumination feature, when activated, is configured to provide a soft glow light source that increases in intensity at a predetermined rate over a predetermined period of time to a predetermined intensity.

4. The baby monitor system of claim 3 wherein the predetermined intensity is established by a user.

5. The baby monitor system of claim 3 wherein the predetermined intensity is configured to provide sufficient illumination to enable a full color viewing of the viewing area using the camera.

6. The baby monitor system of claim 1 wherein the illumination feature is activated and/or deactivated by pressing the illumination button multiple times.

7. The baby monitor system of claim 1 wherein the illumination feature is activated by pressing a first button.

8. The baby monitor system of claim 7 wherein the illumination feature is deactivated by pressing a second button.

9. The baby monitor system of claim 1 wherein the illumination feature is activated and/or deactivated by spoken commands received by a microphone in the remote control unit.

10. A baby monitor unit comprising:
a camera with a viewing area;
a low-lighting feature that is configured to provide low illumination to the camera viewing area; and
a separate illumination feature that is configured to provide greater illumination to the camera viewing area than the low-lighting feature.

11. The baby monitor unit of claim 10 wherein the camera is configured to communicate a full-motion video of the viewing area to a separate remote control unit.

12. The baby monitor unit of claim 11 wherein the remote control unit comprises at least a display area, the display area comprising at least a video area and an illumination button, wherein the illumination button is configured to enable a user to control whether the illumination feature of the baby monitor unit is to be activated and/or deactivated.

13. The baby monitor unit of claim 10 wherein the low-lighting feature provides illumination of the viewing area for the camera when the camera is operating in a low-lighting environment.

14. The baby monitor unit of claim 10 wherein the low-lighting feature comprises an illumination device.

15. The baby monitor unit of claim 14 wherein illumination device comprises one or more near infra-red (NIR) light-emitting diodes (LEDs).

16. A method comprising:
providing a baby monitor system, the baby monitor system comprising:
a baby monitor unit, the baby monitor unit comprising at least a camera with a viewing area, a low-lighting feature that is configured to provide low illumination to the camera viewing area, and a separate illumination feature that is configured to provide greater illumination to the camera viewing area than the low-lighting feature;
a separate remote control unit that is configured to wirelessly communicate with the baby monitor unit, the remote control unit comprising at least a display area, the display area comprising at least a video area and an illumination button, the video area configured to display video that is streamed from the baby monitor unit over a communications link between the baby monitor unit and the remote control unit; and
in response to an input from the illumination button, deactivating the low-lighting feature and activating the illumination feature.

17. The method of claim 16 wherein the activated illumination feature provides a soft glow light source.

18. The method of claim 17 wherein the soft glow light source increases in intensity over a predetermined rate over a predetermined period of time to a predetermined intensity.

19. The method of claim 18 wherein the predetermined intensity is user controllable.

20. The method of claim 18 wherein the predetermined intensity is configured to provide sufficient illumination to enable a full color viewing of the viewing area.

21. The method of claim 16 further comprising deactivating the illumination feature.

22. The method of claim 21 wherein deactivating comprises slowly turning off a soft glow light source.

23. The method of claim 22 further comprising activating the low-lighting feature.

24. The method of claim 23 wherein the low-lighting feature comprises near infrared light emitting diodes (NIR LEDs).

25. An apparatus, comprising:
a camera for generating a video stream of a viewing area,
a low-lighting feature for illuminating the viewing area for the camera under low-lighting conditions, and
a separate illumination feature having an illumination device for illuminating the viewing area to enable the camera to provide full-color video in the video stream, wherein the illumination device is configured to provide greater illumination to the viewing area for the camera than the low-lighting feature.

26. The apparatus of claim 25, wherein the illumination feature increases the intensity of the illumination device at a predetermined rate over a predetermined period of time until a predetermined maximum intensity of the illumination device is reached.

27. The apparatus of claim 25, further comprising a separate remote control unit.

28. The apparatus of claim 27, wherein the remote control unit comprises a display area.

29. The apparatus of claim 28, wherein the display area comprises a video area and an illumination button.

30. The apparatus of claim 29, wherein the video area is configured to display video that is streamed from the baby monitor unit over a communications link between the camera and the remote control unit.

31. The apparatus of claim 29, wherein the illumination button is configured for deactivating the low-lighting feature and activating the illumination feature.

32. A baby monitor system comprising:
a baby monitor unit, the baby monitor unit comprising at least a camera, a low-lighting feature and an illumination feature; and
a remote control unit, the remote control unit comprising at least a display area, the display area comprising at least a video area and an illumination button, the video area configured to display video that is streamed from the baby monitor unit over a communications link between the baby monitor unit and the remote control unit, wherein the illumination feature of the baby monitor unit is activated and/or deactivated by spoken commands received by a microphone in the remote control unit.

* * * * *